(12) United States Patent
Park

(10) Patent No.: US 8,319,910 B2
(45) Date of Patent: Nov. 27, 2012

(54) BACKLIGHT UNIT AND DISPLAY DEVICE HAVING THE SAME

(75) Inventor: Sung Young Park, Ansan-si (KR)

(73) Assignee: LG Innotek Co., Ltd., Seoul (KR)

( * ) Notice: Subject to any disclaimer, the term of this patent is extended or adjusted under 35 U.S.C. 154(b) by 163 days.

(21) Appl. No.: 12/858,067

(22) Filed: Aug. 17, 2010

(65) Prior Publication Data

US 2011/0128465 A1    Jun. 2, 2011

(30) Foreign Application Priority Data

Nov. 27, 2009  (KR) .................. 10-2009-0115631
Mar. 3, 2010   (KR) .................. 10-2010-0019204

(51) Int. Cl.
*G02F 1/1333* (2006.01)
(52) U.S. Cl. .................................... 349/58; 349/60
(58) Field of Classification Search ............... 349/58–60
See application file for complete search history.

(56) References Cited

U.S. PATENT DOCUMENTS

| | | | | | |
|---|---|---|---|---|---|
| 5,570,267 | A | * | 10/1996 | Ma ........................... | 361/679.21 |
| 6,002,582 | A | * | 12/1999 | Yeager et al. ............ | 361/679.21 |
| 7,209,195 | B2 | * | 4/2007 | Lin ............................. | 349/58 |
| 7,369,189 | B2 | * | 5/2008 | Chieh ........................ | 349/58 |
| 7,760,289 | B2 | * | 7/2010 | Nakanishi et al. ......... | 349/60 |
| 7,982,815 | B2 | * | 7/2011 | Hisada ....................... | 349/58 |
| 2003/0043314 | A1 | * | 3/2003 | Lee et al. ................... | 349/65 |
| 2006/0139962 | A1 | * | 6/2006 | Shin et al. .................. | 362/633 |
| 2006/0290836 | A1 | * | 12/2006 | Chang ........................ | 349/58 |
| 2008/0137272 | A1 | * | 6/2008 | Cheng et al. ............... | 361/681 |
| 2008/0198627 | A1 | * | 8/2008 | Matsumoto ................ | 362/633 |
| 2009/0167979 | A1 | | 7/2009 | Watanabe | |
| 2009/0237586 | A1 | * | 9/2009 | Han et al. ................... | 349/58 |
| 2010/0188597 | A1 | * | 7/2010 | Koike et al. ................ | 349/58 |

FOREIGN PATENT DOCUMENTS

| | | |
|---|---|---|
| EP | 2075626 | 7/2009 |
| KR | 10-2005-0065020 A | 6/2005 |
| KR | 10-2006-0010455 A | 2/2006 |
| KR | 10-2006-0105191 A | 10/2006 |
| KR | 10-2006-0131339 A | 12/2006 |
| KR | 10-2008-0077555 | 8/2008 |
| KR | 10-2009-0098549 A | 9/2009 |
| KR | 10-2009-0118435 A | 11/2009 |

* cited by examiner

*Primary Examiner* — Michelle R Connelly
(74) *Attorney, Agent, or Firm* — McKenna Long & Aldridge LLP

(57) ABSTRACT

A backlight unit and a display device having a backlight unit that comprises a panel guide mold, a bottom cover, and a light supply unit, where the panel guide mold and the bottom cover are configured to provide sufficient stiffness and structural stability so that the width of the bezel is very small. The panel guide mold comprises a plurality of first mold units and a plurality of second mold units, where each of the plurality of second mold units is disposed between two of the first mold units, and the plurality of first mold units are offset in an outward direction relative to the plurality of second mold units. The bottom cover comprises a plurality of first sidewalls, each being aligned with a corresponding first mold unit, and a plurality of second sidewalls, where each is disposed between two of the first sidewalls and coupled to a corresponding second mold unit.

22 Claims, 6 Drawing Sheets

BACKLIGHT UNIT AND DISPLAY DEVICE HAVING THE SAME

The present application claims the benefit under 35 U.S.C. §119 of Korean Patent Application No. 10-2009-0115631, filed Nov. 27, 2009, and Korean Patent Application No. 10-2010-0019204, filed Mar. 3, 2010, which are hereby incorporated by reference in its entirety.

BACKGROUND

The present disclosure relates to a backlight unit and a display device having the same.

A liquid crystal display (LCD) device may include a liquid crystal panel for displaying images and a backlight unit disposed on the rear side of the liquid crystal panel to supply light to the liquid crystal panel. The backlight unit may include a lamp or light-emitting diodes (LEDs) as the light source.

The backlight unit may include a bottom cover, a panel guide mold, and a top case. The bottom cover is a base structure where the light source, an optical sheet, and optical sub structures are assembled. The bottom cover must be flat and stiff. The panel guide mold guides the liquid crystal panel, prevents the optical sheet from slipping, and covers the luminance Mura region. In a large display device with a large-sized liquid crystal panel, the panel guide mold is screw-coupled to the bottom cover. Typically, the bezel must be at least about 14 mm wide in order to provide sufficient space for the screw-coupling between the bottom cover and the panel guide mold. The top case fixes the liquid crystal panel guided by the panel guide mold, and may be coupled to the panel guide mold or the bottom cover.

In today's marketplace, consumers want both slimmer LCD devices and narrower bezels. However, narrower bezel designs do not provide the stiffness necessary to secure structural stability.

SUMMARY

The exemplary embodiments disclosed herein are directed to a backlight unit and a display device including the backlight unit. The backlight unit, in accordance with the exemplary embodiments described herein, provides sufficient structural stability and stiffness while at the same time providing a narrow bezel.

In accordance with one aspect of the present invention, and certain exemplary embodiments, the aforementioned and other advantages are achieved by a backlight unit that comprises a panel guide mold, a bottom cover, and a light supply unit disposed between the panel guide mold and the bottom cover. The panel guide mold comprises a plurality of first mold units spaced apart from each other and a plurality of second mold units, wherein each one of the plurality of second mold units is disposed between two consecutive first mold units, and wherein the plurality of first mold units are offset in an outward direction relative to the plurality of second mold units to form an alternating, step-like structure. The bottom cover comprises a plurality of first sidewalls spaced apart from each other and a plurality of second sidewalls, wherein each one of the second sidewalls is disposed between two consecutive first sidewalls, and wherein each of the plurality of the first sidewalls is coupled to a corresponding one of the plurality of first mold units and each of the plurality of second sidewalls is coupled to a corresponding one of the plurality of second mold units.

In accordance with another aspect of the present invention, the aforementioned and other advantages are achieved by a display device that comprises a backlight unit, a display panel and a fixing unit configured to fix the display panel and the backlight unit. The backlight unit comprises a panel guide mold that comprises a plurality of first mold units spaced apart from each other and a plurality of second mold units, wherein each one of the plurality of second mold units is disposed between two consecutive first mold units, and wherein the plurality of first mold units are offset in an outward direction relative to the plurality of second mold units to form an alternating, step-like structure. The backlight unit also comprises a bottom cover comprising a plurality of first sidewalls spaced apart from each other and a plurality of second sidewalls, wherein each one of the second sidewalls is disposed between two consecutive first sidewalls, and wherein each of the plurality of the first sidewalls is coupled to a corresponding one of the plurality of first mold units and each of the plurality of second sidewalls is coupled to a corresponding one of the plurality of second mold units. The backlight unit also has a light supply unit disposed between the panel guide mold and the bottom cover. Further, the display panel is disposed on the panel guide mold of the backlight unit, and the fixing unit is configured to fix the display panel and the backlight unit.

In accordance with an aspect of the present invention, and certain exemplary embodiments, the aforementioned and other advantages are achieved by a backlight unit that comprises a panel guide mold, a bottom cover and a light supply unit between the panel guide mold and the bottom cover. The panel guide mold comprises a plurality of first mold units spaced apart from each other and a plurality of second mold units, wherein each one of the plurality of second mold units is disposed between and connected with two consecutive first mold units, and wherein each of the plurality of first mold units protrudes outward relative to each of the plurality of second mold units to form a step-like structure. The bottom cover comprises a plurality of first sidewalls spaced apart from each other and a plurality of second sidewalls, wherein each one of the second sidewalls is disposed between and connected with two consecutive first sidewalls, wherein each of the plurality of the second sidewalls protrudes outward relative to each of the plurality of first sidewalls, and wherein each of the plurality of first sidewalls aligns with a corresponding one of the plurality of first mold units and each of the plurality of second sidewalls aligns with and is coupled to a corresponding one of the plurality of second mold units.

The details associated with one or more exemplary embodiments are set forth herein below and in the accompanying drawings. Other features will be apparent from the description, drawings, and the claims.

DETAILED DESCRIPTION OF THE EMBODIMENTS

Various exemplary embodiments will now be described in detail. In describing certain features associated with the exemplary embodiments, reference will be made to the accompanying drawings to better illustrate those features.

In the descriptions of embodiments, it will be understood that when a layer (or film), a region, a pattern, or a structure is referred to as being "on" or "under" another structure, it can be indirectly on or directly on the other structure. Thus, it may be in contact with the other structure or, alternatively, it may not contact the other structure and include intervening layers there between. A better understanding of "on" and "under" may be obtained by referencing the drawings.

In the figures, the dimensions of each element are exemplary, and they may be exaggerated in size for clarity of illustration. Thus, the dimensions of each element may be different from the actual dimensions of a manufactured product.

The various aspects of the present invention, in accordance with exemplary embodiments thereof, will now be described. to facilitate the description, reference is made to FIGS. 1 to 6.

Figure 1:
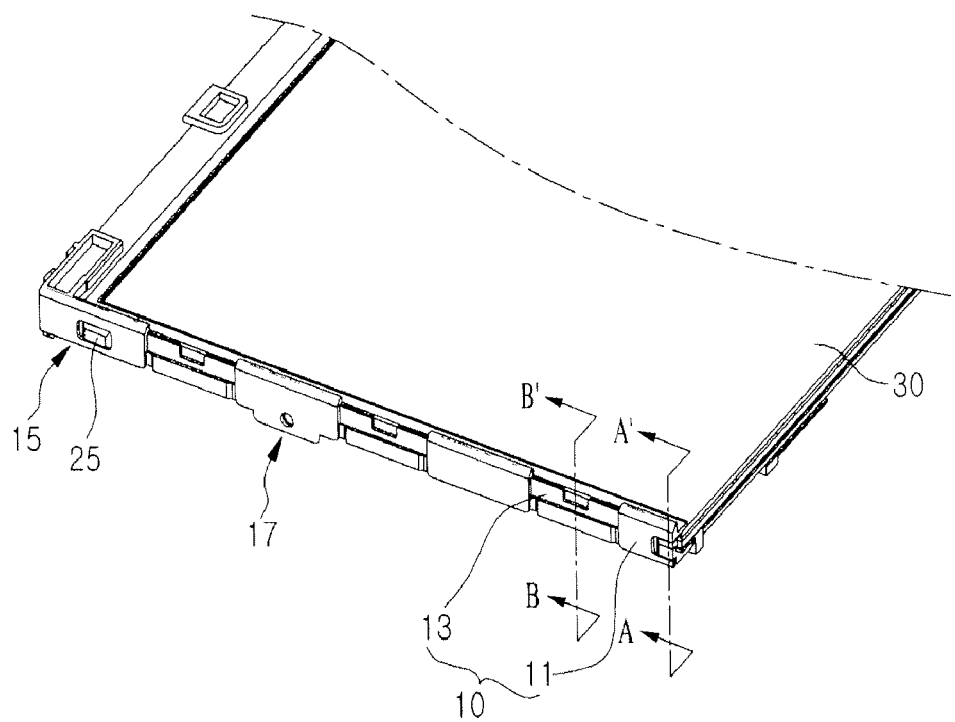
FIG. 1 is a perspective view of a backlight unit according to an exemplary embodiment.
Figure 2:
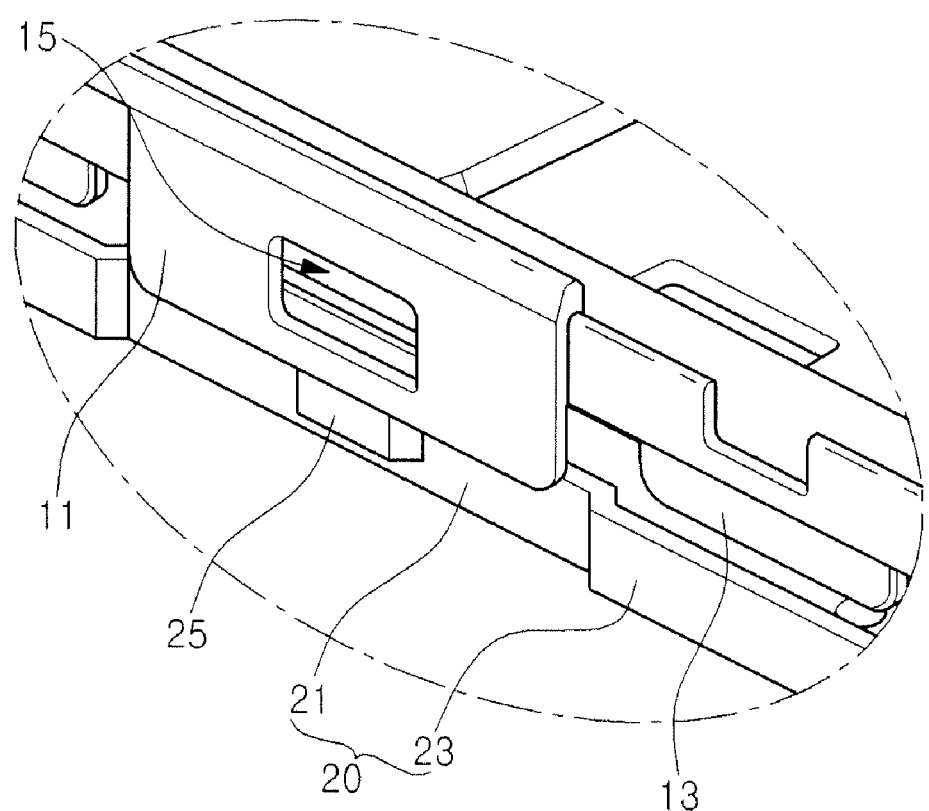
FIG. 2 is another perspective view of the backlight unit according to the exemplary embodiment illustrated in FIG. 1.

As illustrated in FIGS. 1 and 2, a backlight unit according to an exemplary embodiment includes a panel guide mold 10, a bottom cover 20, and a light supply unit 30. With specific reference to FIG. 1, the panel guide mold 10 may include a plurality of first mold units 11 and a plurality of second mold units 13. A groove or opening 15 may be formed through one or more of the first mold units 11. Also, a screw hole 17 may be formed through one or more of the first mold units 11 as shown. More will be said later about the screw hole 17, including the purpose of the screw hole 17.

With specific reference to FIG. 2, the bottom cover 20 may include a plurality of first sidewalls 21 and a plurality of second sidewalls 23. Each of the first sidewalls 21 generally align with a corresponding one of the first mold units 11. A protrusion 25 may be formed on one or more of the first sidewalls 21 at a position corresponding to the groove 15. Similarly, each of the second sidewalls 23 generally aligns with a corresponding one of the second mold units 13. As shown, the second sidewalls 23 may extend outward to create a space there behind (i.e., an inward space) to receive a corresponding one of the second mold units 13 or a portion thereof.

Figure 3:
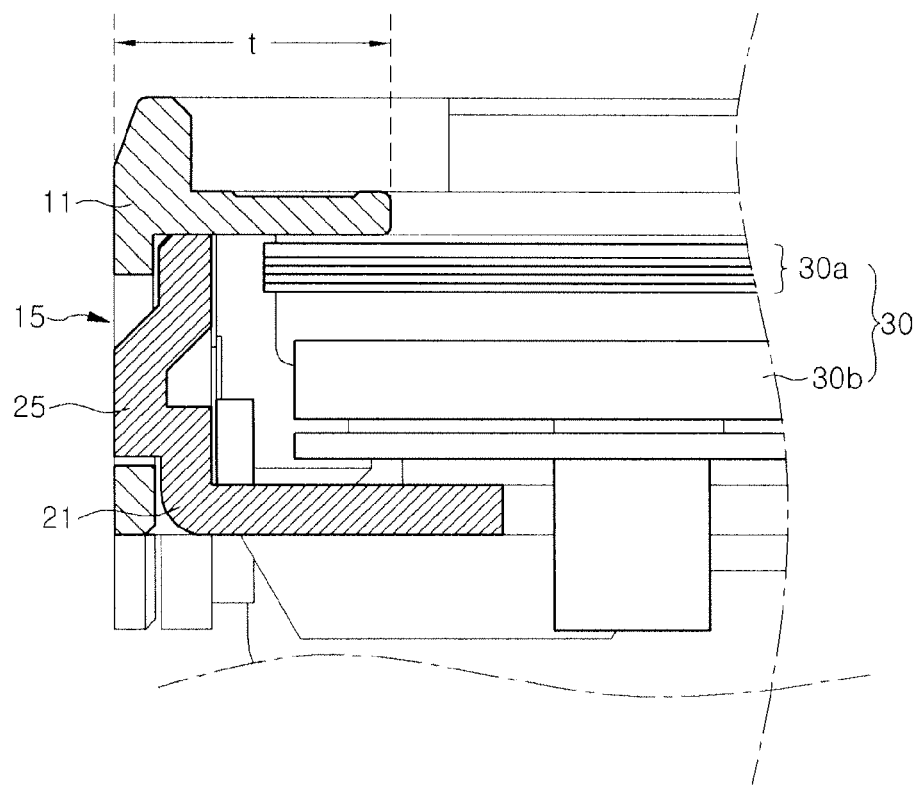
FIG. 3 is a sectional view taken along line A-A' of FIG. 1.
Figure 4:
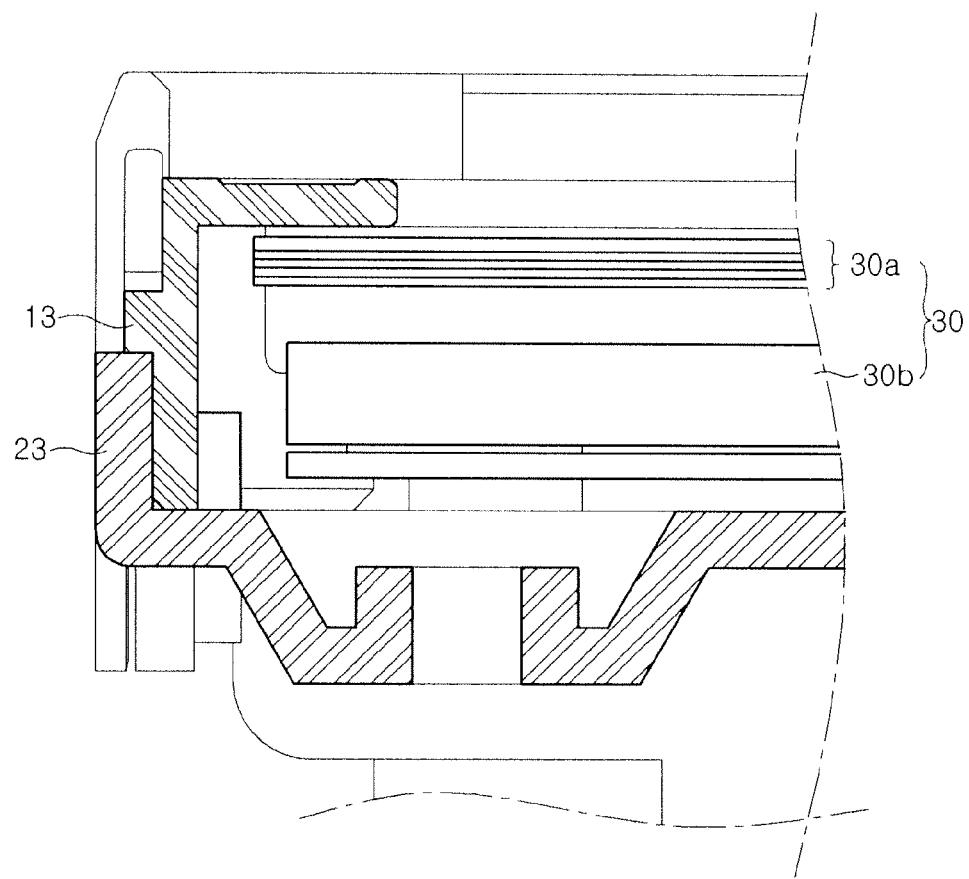
FIG. 4 is a sectional view taken along line B-B' of FIG. 1.

The light supply unit 30 is disposed between the panel guide mold 10 and the bottom cover 20 as illustrated, for example, in FIGS. 3 and 4. The light supply unit 30 may include one or more optical system components including a light source (not shown), an optical sheet 30a, a light guide panel 30b, and a reflection sheet 30c. A lamp(s) or LEDs may be used as the light source. Accordingly, the light supply unit 30 may be implemented as an edge-type or a direct-type light supply.

Referring again to FIG. 1, each of the plurality of first mold units 11 may be spaced apart from each other with a second mold unit 13 disposed in between and connected with two consecutive spaced apart first mold units 11. As shown more clearly in FIG. 2, the first and second mold units 11 and 13 are offset from each other, such that an alternating, step-like or zigzag structure is formed. In the exemplary embodiment illustrated in FIGS. 1 and 2, the plurality of first mold units 11 are offset, that is projected further in an outward direction relative to the plurality of second mold units 13. In addition, the panel guide mold 10, including the first mold units 11 and the second mold units 13, is formed as a united body. In this manner, the united body along with the step-like or zigzag structure provide stiffness and structural stability without having to employ a wide bezel.

With continued reference to FIG. 2, the bottom cover 20 may be configured such that the plurality of first sidewalls 21 are spaced apart from each other with one of the second sidewalls 23 disposed in between and connected with two consecutive, spaced apart first sidewalls 21, as illustrated. Like the plurality of first guide mold units 11 and the plurality of second guide mold units 13, the plurality of first sidewalls 21 and the plurality of second sidewalls 23 may be formed in an alternating, step-like or zigzag structure. Moreover, the bottom cover 20, like the panel guide mold 10, may also be formed as a united body. In this manner, the bottom cover 20 with its united body and step-like or zigzag structure exhibits greater stiffness and structural stability without the need for a wide bezel.

We now refer to FIGS. 3 and 4. When the backlight unit is assembled, one or more of the first sidewalls 21 of the bottom cover 20 are coupled to a corresponding first mold unit 11 of the panel guide mold 10. In addition, one or more of the second sidewalls 23 of the bottom cover 20 are coupled to a corresponding second mold unit 13 of the panel guide mold 10. As stated above, the first and second mold units 11 and 13 of panel guide mold 10 form an alternating, step-like or zigzag structure. The same is true for the first and second sidewalls 21 and 23 of the bottom cover 20. As shown in FIG. 2, however, the alternating, step-like or zigzag structures associated with the panel guide mold 10 and the bottom cover 20 are offset or shifted relative to each other. Thus, where the first mold unit 11 protrudes, the first sidewall 21 is recessed. Where the second sidewall 23 protrudes, the second mold unit 13 is recessed. Accordingly, when the bottom cover 20 and the panel guide mold 10, both of which are formed as a united body, are coupled together, they provide stiffness and structural stability to the backlight unit without the need for a wide bezel.

As stated, the backlight unit according to the above-identified exemplary embodiments exhibits sufficient structural stiffness while implementing a narrow bezel. As an example, even in the case where the backlight unit is used with a 47-inch, 55-inch or larger-sized display panel, it is possible to exhibit the necessary structural stiffness while employing a narrow bezel width t of about 7 mm, as illustrated. In this manner, the first sidewalls 21 and the second sidewalls 23 of the bottom cover 20 may exhibit an "L" bending structure, as illustrated in cross-section in FIGS. 3 and 4, in order to implement a narrow bezel, in comparison to the wider, U-shaped bending bezel structure in accordance with the related art.

With further reference to FIGS. 3 and 4, the coupling of the panel guide mold 10 and the bottom cover 20 will now be described in greater detail. With specific reference to FIG. 3, it can be seen that the first mold unit 11 and the first sidewall 21 may engage each other in order to increase the coupling force between the panel guide mold 10 and the bottom cover 20. This may be achieved, for example, with the groove 15 and the protrusion 25. As stated, the groove 15 may be formed through one or more of the first mold units 11, as shown in cross-section in FIG. 3, whereas the protrusion 25 may be formed on corresponding first sidewalls 21, at a position aligned with groove 15. When the panel guide mold 10 and the bottom cover 20 come together and are connected, the protrusion 25 passes through groove 15, whereby the first mold unit 11 and the first sidewall 21 are coupled in a hook-like engagement. This, in turn, further enhances the stiffness and structural stability of the backlight unit. In FIGS. 1-3, the groove 15 and the protrusion 25 are illustrated as being generally rectangular in shape, however, the inventive concept is not limited thereto.

With specific reference to FIG. 4, a portion of each second mold unit 13 of panel guide mold 10 aligns with and inserts into the inward space formed behind the corresponding, protruding second sidewall 23 of the bottom cover 20. In this manner, the panel guide mold 10 and the bottom cover 20 are further coupled together, thereby providing additional stiffness and structurally stability for the backlight unit.

As described above, the backlight unit according to the exemplary embodiment described above provides a structurally stable device that can secure all of mutual coupling, assemblage, stiffness, and optical stability.

According to a preferred embodiment, a top case may be omitted, unlike related art backlight structures. According to this exemplary embodiment, a backlight unit frame can be provided with a panel guide panel 10 and a bottom cover 20, but without a top case. This is possible because sufficient stiffness and structural stability is provided even with a narrow bezel, due at least in part to the step-like or zigzag structure and coupling of the panel guide mold 10 and the bottom cover 20. In accordance with other exemplary embodiments, the backlight unit may include a top case.

A fabrication process for manufacturing and/or assembling a display device differs if a backlight unit is configured in accordance with the exemplary embodiments described above. In general, related art display device fabrication processes involve a first process of assembling a backlight unit, a second process of assembling the backlight unit and a display panel, and a third process of assembling a complete display device. However, if a backlight unit according to the exemplary embodiments described above is used, the second process of assembling a backlight unit and a display panel can be omitted. Instead, a display panel is disposed on the backlight unit according to the exemplary embodiment and the backlight unit and the display panel are directly fixed using a fixing unit, thereby completing the assembly of the display device.

Figure 5:
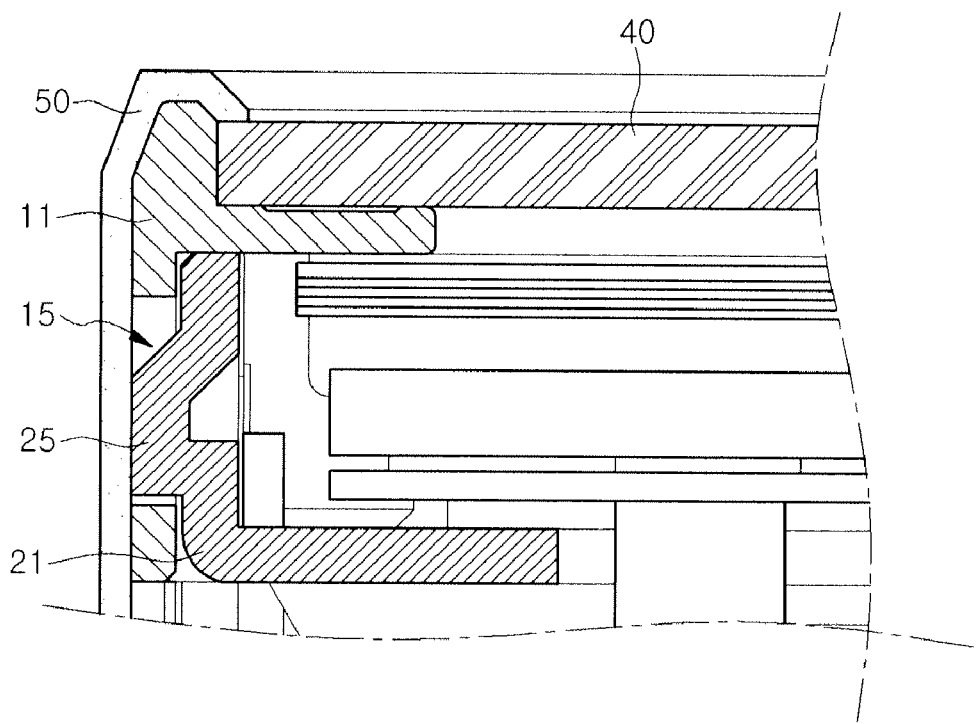
FIG. 5 is a sectional view of a display device including the backlight unit as illustrated in FIGS. 1-4.
Figure 6:
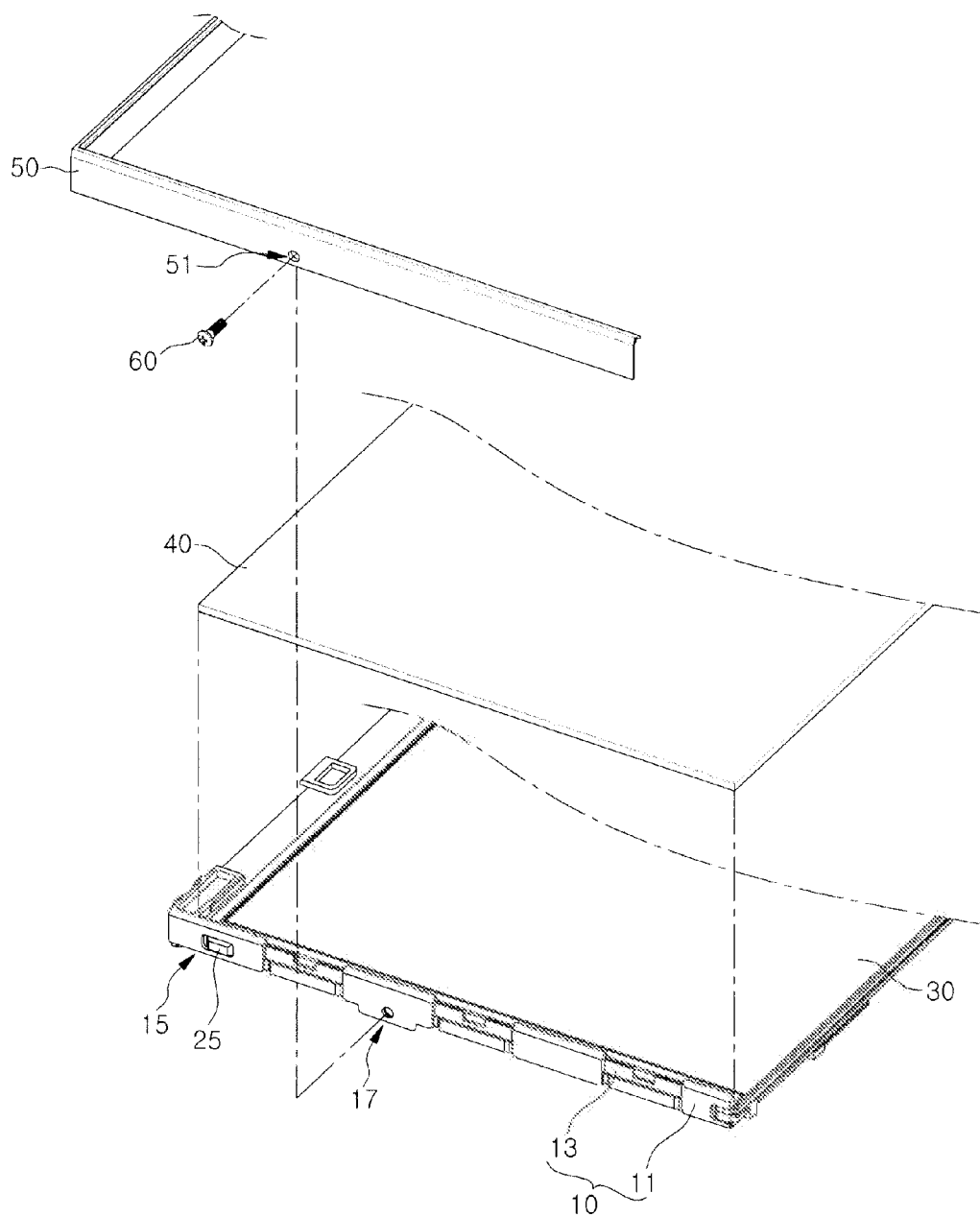
FIG. 6 is a perspective view illustrating an exemplary configuration for assembling the display device of FIG. 5.

Referring now to FIGS. 5 and 6, we describe another aspect of the invention. As stated, for example, a fixing unit 50 directly fixes the backlight unit and the display panel 40. In the exemplary embodiment illustrated in FIGS. 5 and 6, the fixing unit 50 may be configured to cover the top edge of the display panel 40 and the sidewalls of the backlight unit, as shown. In addition, the fixing unit 50 may be coupled to the panel guide mold 10 of the backlight unit, for example, by a screw 60 and the screw hole 17 formed through the one or more first mold units 11 of the panel guide mold 10. The fixing unit 50 is a separate component from the complete display device, and from a top case, as used in related art backlight units. Thus, in accordance with this other aspect of the invention, and in accordance with the exemplary embodiments described above, a display device includes a display panel 40, such as an LCD panel, a fixing unit 50, and a backlight unit that includes a panel guide mold 10, a bottom cover 20, and a light supply unit 30, as previously described.

As stated above, the aforementioned exemplary embodiments make it possible to implement a backlight unit and a display device that is sufficiently stiff and structurally stable while employing a narrow bezel. Also, the exemplary embodiments make it possible to reduce fabrication costs and improve productivity by simplifying the fabrication process in comparison with the related art.

Although exemplary embodiments have been described, it should be understood that numerous modifications and other exemplary embodiments are possible, including variations and modifications of the component parts and/or the arrangement of the component parts. All are within the scope and spirit of the disclosure. In addition to the variations and modifications of the component parts and/or the arrangement of the component parts, alternative uses will also be apparent to those skilled in the art.

What is claimed is:

1. A backlight unit comprising:
    a panel guide mold that comprises a plurality of first mold units spaced apart from each other and a plurality of second mold units, wherein each one of the plurality of second mold units is disposed between two consecutive first mold units, and wherein the plurality of first mold units are offset in an outward direction relative to the plurality of second mold units to form an alternating, step-like structure;
    a bottom cover comprising a plurality of first sidewalls spaced apart from each other and a plurality of second sidewalls, wherein each one of the second sidewalls is disposed between two consecutive first sidewalls, wherein the plurality of second sidewalls are offset in an outward direction relative to the plurality of first sidewalls to form an alternating, step-like structure, where the second sidewall protrudes, the second mold unit is recessed, and wherein each of the plurality of the first sidewalls is inserted and coupled to a corresponding one of the plurality of first mold units offset in an outward direction and each of the plurality of second sidewalls offset in an outward direction receives and is coupled to a corresponding one of the plurality of second mold units; and
    a light supply unit disposed between the panel guide mold and the bottom cover.

2. The backlight unit according to claim 1, wherein the plurality of first mold units protrude further in an outward direction relative to the plurality of the second mold units.

3. The backlight unit according to claim 1, wherein one or more of the plurality of first sidewalls comprises a protrusion, wherein the first mold unit corresponding to each of the one or more first sidewalls comprises an opening such that when the panel guide mold and the bottom cover are coupled together, each protrusion passes through the corresponding opening.

4. The backlight unit according to claim 3, wherein each protrusion passes through the corresponding opening in a hook-like engagement to hold the panel guide mold and the bottom cover together.

5. The backlight unit according to claim 1, wherein the plurality of second sidewalls are offset in an outward direction relative to the plurality of first sidewalls to form an alternating, step-like structure.

6. The backlight unit according to claim 5, wherein the plurality of first mold units and the plurality of second mold units together form a united body, and wherein the plurality of first sidewalls and the plurality of second sidewalls together form a united body.

7. The backlight unit according to claim 5, wherein each of the plurality of second sidewalls protrude further in an outward direction relative to each of the plurality of first sidewalls.

8. The backlight unit according to claim 7, wherein each of the plurality of second sidewalls forms an inward space as a result of each sidewall protruding outward, and wherein the second mold unit corresponding to each of the plurality of second sidewalls inserts into the inward space formed by the corresponding second sidewall when the panel guide mold and the bottom cover are coupled together.

9. The backlight unit according to claim 1 further comprising a top case.

10. A display device comprising:
    a backlight unit that comprises,
    a panel guide mold that comprises a plurality of first mold units spaced apart from each other and a plurality of second mold units, wherein each one of the plurality of second mold units is disposed between two consecutive first mold units, and wherein the plurality of first mold units are offset in an outward direction relative to the plurality of second mold units to form an alternating, step-like structure, a bottom cover comprising a plurality of first sidewalls spaced apart from each other and a plurality of second sidewalls, wherein each one of the second sidewalls is disposed between two consecutive first sidewalls, wherein the plurality of second sidewalls are offset in an outward direction relative to the plurality of first sidewalls to form an alternating, step-like structure, where the second sidewall protrudes, the second mold unit is recessed, and wherein each of the plurality of first sidewalls is inserted and coupled to a corresponding one of the plurality of first mold units offset in an outward direction and each of the plurality of second sidewalls offset in an outward direction receives and is coupled to a corresponding one of the plurality of second mold units, and a light supply unit disposed between the panel guide mold and the bottom cover;

a display panel disposed on the panel guide mole of the backlight unit; and a fixing unit configured to fix the display panel and the backlight unit.

11. The display device according to claim 10, wherein the plurality of first mold units protrude further in an outward direction relative to the plurality of the second mold units.

12. The display device according to claim 10, wherein one or more of the plurality of first sidewalls comprises a protrusion, wherein the first mold unit corresponding to each of the one or more first sidewalls comprises an opening such that when the panel guide mold and the bottom cover are coupled together, each protrusion passes through the corresponding opening.

13. The display device according to claim 12, wherein each protrusion passes through the corresponding opening in a hook-like engagement to hold the panel guide mold and the bottom cover together.

14. The display device according to claim 10, wherein the plurality of second sidewalls are offset in an outward direction relative to the plurality of first sidewalls to form an alternating, step-like structure.

15. The display device according to claim 14, wherein the plurality of first mold units and the plurality of second mold units together form a united body, and wherein the plurality of first sidewalls and the plurality of second sidewalls together form a united body.

16. The display device according to claim 14, wherein each of the plurality of second sidewalls protrude further in an outward direction relative to each of the plurality of first sidewalls.

17. The display device according to claim 16, wherein each of the plurality of second sidewalls forms an inward space as a result of each sidewall protruding outward, and wherein the second mold unit corresponding to each of the plurality of second sidewalls inserts into the inward space formed by the corresponding second sidewall when the panel guide mold and the bottom cover are coupled together.

18. The display device according to claim 10 further comprising a top case.

19. The display device according to claim 10, wherein the fixing unit is in contact with an edge portion of the display panel and connected through a fastening element associated with one or more of the first mold units.

20. A backlight unit comprising:

a panel guide mold that comprises a plurality of first mold units spaced apart from each other and a plurality of second mold units, wherein each one of the plurality of second mold units is disposed between and connected with two consecutive first mold units, and wherein each of the plurality of first mold units protrudes outward relative to each of the plurality of second mold units to form a step-like structure;

a bottom cover that comprises a plurality of first sidewalls spaced apart from each other and a plurality of second sidewalls, wherein each one of the second sidewalls is disposed between and connected with two consecutive first sidewalls, wherein each of the plurality of the second sidewalls protrudes outward relative to each of the plurality of first sidewalls, and wherein each of the plurality of first sidewalls is inserted and aligns with a corresponding one of the plurality of first mold units and each of the plurality of second sidewalls aligns with, and is received and coupled to a corresponding one of the plurality of second mold units; and a light supply unit disposed between the panel guide mold and the bottom cover.

21. The backlight unit of claim 20, wherein one or more of the plurality of first sidewalls comprise a protrusion, and the first mold unit corresponding to each of the one or more first sidewalls comprises an opening, and wherein the protrusion associated with each of the one or more first sidewalls passes through the opening associated with the corresponding first mold unit such that each of the one or more first sidewalls and the first mold unit corresponding to each of the one or more first sidewalls are coupled to each other.

22. The backlight unit of claim 20, wherein each of the plurality of second sidewalls forms an inward space due to each of these sidewalls protruding outward, and wherein the second mold unit corresponding to each of the plurality of second sidewalls inserts into the inward space thereby coupling each of the plurality of second sidewalls to the corresponding second mold unit.

* * * * *